United States Patent Office 3,434,871
Patented Mar. 25, 1969

3,434,871
METHOD FOR PREPARING CHROMIUM-CONTAINING FILMS
Anna P. Hauel, West Orange, and Robert C. Langley, Millington, N.J., assignors to Engelhard Industries, Inc., Newark, N.J., a corporation of Delaware
No Drawing. Filed Dec. 13, 1965, Ser. No. 513,585
Int. Cl. C23c 13/00, 17/00
U.S. Cl. 117—119                            6 Claims

ABSTRACT OF THE DISCLOSURE

Chromium-containing films are prepared by thermal decomposition of a chromium halide-lower alkyl amine complex in a non-oxidizing atmosphere at temperatures between about 500° C. and 1000° C.

---

This invention relates to a method for the preparation of chromium-containing films, and is particularly concerned with the deposition of thin electrically conductive films containing chromium from solutions of chromium compounds.

It has heretofore been proposed to deposit chromium-containing films by thermal decomposition of chromium hexacarbonyl from the vapor phase. It would be advantageous to prepare such films by deposition from the liquid phase, e.g., organic solutions of compounds of chromium, which could be brushed or painted on the substrate to be coated. However, efforts to deposit chromium-containing films on substrates coated with organic solutions of chromium hexacarbonyl have not been successful; upon heating, chromium hexacarbonyl sublimes without decomposing to the metal on the substrate. Both chromium hexacarbonyl and chromium halides have been used for vapor deposition of chromium-containing films. However, there are many problems inherent in obtaining films from vapor phase. For example, it is difficult to obtain a uniform film, particularly on substrates of large size or complex shapes, temperatures of the volatile materials and substrate must be carefully controlled, considerable amounts of metal can be lost and it is often difficult to place the film where desired on the substrate. It was further found that solutions of chromium halides, e.g., $CrCl_2$, could be prepared in certain oxygenated solvents such as water, ethanol, methanol and dimethylformamide. However, upon heating the oxygen-containing solutions in a hydrogen atmosphere, the recovered films were primarily chromium oxide.

In accordance with the present invention, chromium-containing films are prepared by thermal decomposition in a non-oxidizing atmosphere of organic solutions containing chromium halide-amine complexes. Such solutions are stable, i.e., they do not react readily with air or moisture, and upon thermal decomposition in a non-oxidizing atmosphere yield chromium-containing films which are essentially free of oxides of chromium. The films so obtained are refractory, lustrous and electrically conductive, and by X-ray analysis appear to consist of metallic chromium and/or chromium carbide. Such films are suitable as resistor coatings on refractories, as conductive thin films, and as corrosion-resistant, thermally stable and oxidation-resistant films.

The chromium films are prepared in accordance with this invention by thermal decomposition of a chromium halide-amine complex. In preparing the complex, halides of di- or tri-valent chromium, for example, chlorides, bromides or iodides in anhydrous form, are reacted with an organic amine complexing agent. Preferably, the chromium halide is divalent, e.g., $CrCl_2$, since it has been found that bivalent chromium is easier to reduce in the presence of hydrogen during subsequent heat treatment to form the chromium-containing film.

The chromium halide, e.g., $CrCl_2$, is reacted with a molar excess of an organic amine, and if indicated by viscosity requirements, in the presence of an organic solvent such as toluene, chloroform and the like in which the amine complex is soluble. Normal and branched alkyl amines, aryl amines, and cyclic amines such as pyridine, may be employed. Some amines react with and dissolve the chromium halides more readily than others. For example, n-propyl-, isopropyl-, and butyl- amines form complexes with chromium chlorides at room temperature which may be applied without additional solvents to a substrate. Solvents may, however, be employed, to form a solution of the complex, e.g. the chromous chloride-benzyl amine complex is soluble in toluene and chloroform. Examples of suitable amines include n-propyl, isopropyl, n-butyl-, triethylene-tetraamines, p-n-amylpyridine, diethylamine, benzylamine, ethanolamine and the like having from about 1 to about 20 carbon atoms in the molecule.

Suitable film forming vehicles, well known in the art of printing, painting, and metal decorating, may be added, for example, solutions containing aromatic solvents, essential oils, and the like chosen for their viscosity, tack, drying time, and their property of wetting particular substrates.

The chromium halide-amine complex, alone or dissolved in a suitable solvent, is applied to a substrate by brushing, spraying or other conventional means for applying thin films. The substrate may be metal or non-metal, but must be stable at high temperatures, i.e., at least 500° C. Examples of substrates are quartz, high temperature glasses, glazed and unglazed ceramics, tungsten, high temperature metal alloys, steel, carbon, carbides or borides etc.

The chromium containing film is obtained by heating the chromium halide-amine complex at elevated temperature, e.g., from 500 to 1000° C., preferably 700–900° C., in a non-oxidizing atmosphere, preferably in a hydrogen-containing atmosphere.

Example I

A mixture containing chromous halide-amine complex was prepared by admixing:

|  | G |
|---|---|
| Acetone oxime | 0.02 |
| Isopropylamine | 3.3 |
| n-Propylamine | 3.3 |
| $CrCl_2$ | 0.44 |

The resultant solution was painted on a quartz slide and heated in a hydrogen atmosphere over a period of 107 minutes to a maximum temperature of 900° C., then held at this temperature for 15 minutes. Upon cooling, the deposit was conductive, lustrous and by X-ray diffraction appeared to be chromium carbide.

Example II

A solution of 1.4 g. $CrCl_2$, +10.9 g. benzylamine and 3 g. toluene was refluxed under a nitrogen blanket at 110° C. for 1½ hours, cooled and painted on a quartz slide. The slide was left exposed to air overnight. The slide was then heated to a maximum temperature of 900° C. over a period of 77 minutes in a hydrogen atmosphere, and held at this temperature for 15 minutes. The resulting film was grey and lustrous, had excellent electrical conductivity and by X-ray diffraction appeared to consist essentially of chromium carbide.

Example III

A solution of 0.45 g. $CrCl_2$, 7.0 g. n-propylamine, 1.0 g. ethanolamine was prepared and painted on a quartz slide. The slide was then heated in an $H_2$ atmosphere to a maximum temperature of 900° C. over a period of 101 minutes and held at this temperature for 15 minutes. The resulting film was lustrous, conductive, and by X-ray diffraction appeared to be chromium carbide.

Example IV

A more concentrated formulation of chromium in solution than shown in Example III was prepared and chloroform was added to decrease the viscosity. The solution prepared consisted of 0.74 g. $CrCl_2$, 5.18 g. n-propylamine, 0.17 g. ethanolamine, and 2.46 g. chloroform. This solution was painted on a quartz slide, heated in an $H_2$ atmosphere to a maximum temperature of 900° C. over a period of 148 minutes, and held at this temperature for 15 minutes. The resulting film was lustrous, conductive, and by X-ray diffraction found to be chromium carbide.

What is claimed is:

1. A process for the preparation of a substantially chromium-containing film which comprises coating a substrate thermally stable above at least 500° C. with a chromium halide-amine complex wherein the amine is selected from the group consisting of lower alkyl amines, benzylamine and pyridine in the liquid phase and heating the coated substrate in a non-oxidizing atmosphere at a temperature between about 500° C. and 1000° C. to thermally decompose said complex, thereby forming a chromium-containing film on said substrate.

2. Process of claim 1 wherein the amine complex is dissolved in an organic solvent.

3. Process of claim 1 wherein the coated substrate is heated in a hydrogen-containing atmosphere.

4. Process of claim 1 wherein the chromium halide-amine complex is the reaction product of chromous chloride and a lower alkyl amine.

5. Process of claim 4 wherein the lower alkyl amine is n-propylamine.

6. Process of claim 1 wherein the chromium halide-amine complex is the reaction product of chromous chloride and benzylamine.

References Cited

UNITED STATES PATENTS

| | | | |
|---|---|---|---|
| 3,369,933 | 2/1968 | Schulman et al. | 117—160 X |
| 3,378,569 | 4/1968 | Pruett et al. | 117—124 X |

RALPH S. KENDALL, *Primary Examiner.*

U.S. Cl. X.R.

117—107.2, 123, 124, 130, 160, 127, 169, 121, 106, 227, 229, 230